Sept. 11, 1923.
J. C. DAWSON
1,467,781
MEANS FOR SECURING HEADED ARTICLES IN PLACE
Filed May 3, 1922
FIG. 1
FIG. 2
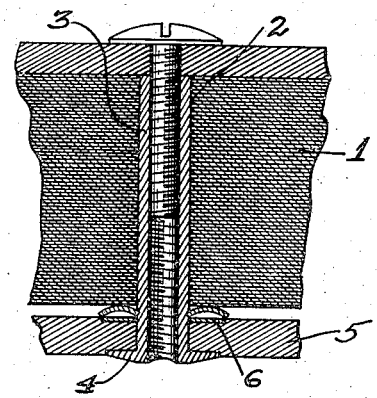
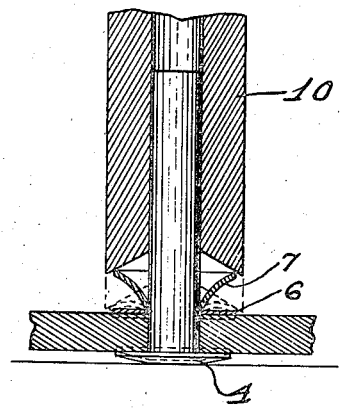
FIG. 3
FIG. 4
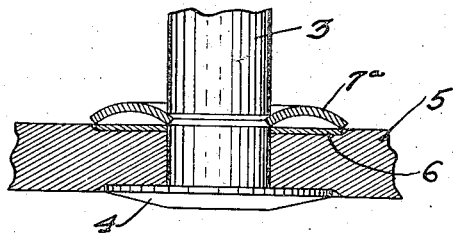
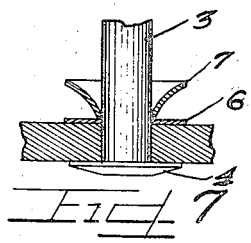
FIG. 5  FIG. 6
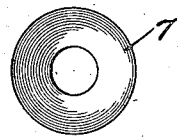
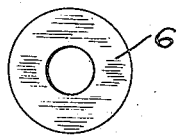
FIG. 7
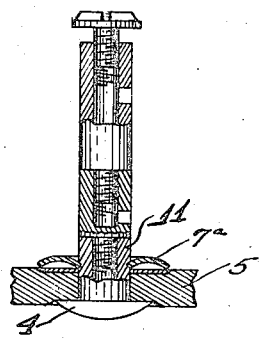
WITNESSES
Rudolph J. Berg.
INVENTOR
JAMES C. DAWSON.
By Charles O. Mills Atty.

Patented Sept. 11, 1923.

1,467,781

UNITED STATES PATENT OFFICE.

JAMES C. DAWSON, OF WEBSTER GROVES, MISSOURI, ASSIGNOR TO HUGH G. BUCHAN, OF ST. LOUIS, MISSOURI.

MEANS FOR SECURING HEADED ARTICLES IN PLACE.

Application filed May 3, 1922. Serial No. 558,232.

*To all whom it may concern:*

Be it known that I, JAMES C. DAWSON, a citizen of the United States, residing at Webster Groves, in the county of St. Louis and State of Missouri, have invented certain new and useful Improvements in a Means for Securing Headed Articles in Place; and I do hereby declare that the following is a full, clear, and exact description of the same, reference being had to the accompanying drawings, and to the numerals of reference marked thereon, which form a part of this specification.

This invention relates to a washer for securing in place headed articles such as the binding posts of temporary binders. A fastening of this kind is disclosed in the application of Hugh Gillroy Buchan, for a "Means and method of fastening headed articles in place," Serial No. 498,118, filed September 2nd, 1921, and the present application is for an improvement thereof.

It is an object of this invention to provide a fastener of the kind just indicated which shall more securely retain the headed article in place.

It is a further object of this invention to provide a backing which shall insure that the inner edge of the fastening washer shall not penetrate the material in which the headed article is located but instead shall penetrate the shank of the headed member.

It is a further object of this invention to provide a washer of such a shape that it shall cooperate with a countersunk tool to produce a fastening of an effective shape.

It is a further object of this invention to produce an annular arched washer which shall secure the post in place.

It is a further object of this invention to provide a blank of such a shape that it will assume the arched form just mentioned when it is forced into place.

Other and further important objects of this invention will be apparent from the disclosures in the drawings and in the specification.

The invention (in a preferred form) is illustrated in the drawings and hereinafter more fully described.

On the drawings:

Figure 1 is a sectional view of a binder which illustrates the application of my invention thereto.

Figure 2 is a section of the post and the tool showing how the latter is used in forcing the fastener into its final shape and position.

Figure 3 is a sectional view illustrating the final condition of the fastener.

Figure 4 is a similar view showing the parts in the shape they have before the tool is used.

Figure 5 is a plan of the curved washer.

Figure 6 is a plan of the flat washer.

Figure 7 is a section of a different form of post, showing the application of my invention thereto.

As shown on the drawings:

The binder 1 has the usual binding posts 2 which include a hollow sleeve 3 internally threaded to receive the complementary screw and having a head 4. The head rests against one cover 5 of the binder which may be of any form desired, and is illustrated as made of the usual soft material such as cardboard or leather.

Over the sleeve 3 is slipped an ordinary flat washer 6 which bears against the inner face of the cover 5, and then the conical blank 7 which is to become an arched washer 7ᵃ is slipped over the shank 3, and brought to position shown in Figure 4. This blank is of a generally conical form, but instead of an ordinary conical surface, the sides are arched inward, as shown in Figure 4. A tool 10, preferably a countersunk punch, is placed over the tube 3 and made to bear against the upper edge of the blank 7. The punch is then struck to force the blank 7 from the position and shape shown in full lines in Figure 2 to the position and shape shown in dotted lines in that figure and in full lines in Figure 3. During this change in form of the blank 7, the inner edge 8 of the blank will penetrate into the shank 3 of the binding post. When the punch 10 delivers the force of the blow to the blank 7, the angle between the general direction of the blank 7 and the vertical causes this force to be resolved into two components, one of which acting directly downward tends to force the washer 6 into the material of the cover 5. The bearing of the head 4 against the anvil upon which this work is done tends to force the head also into the cover 5. The other component of the force exerted by the punch upon the blank 7 tends to thrust the end of this blank into the material of the post.

Because the blank does not provide a straight line between the lower corner which bears against the washer 6 and against the post, and the upper corner which bears against the punch, the blank will yield under the influence of the punch and assume the arched form illustrated at 7ª in Figures 3 and 7. The curved form of the blank 7 causes a corner of the lower edge to bear against the post instead of the full width of the edge thus bearing. This results in an easier penetration of the post by the blank during the deformation of the blank.

The presence of the washer 6, by preventing any yielding towards the head 4, will cause this penetration to take place to a greater extent and with more certainty than would be the case if the washer 6 were not used. Consequently, the depth of the groove made by the edge 8 in the shank 3 will be greater than it would otherwise be. Also the post will be more securely fastened in place.

It is obvious that this style of fastening is not limited in its application to the form of post illustrated in Figure 1, but may be used for securing any form of post, for example, the sectional form shown in Figure 7, in which the lowest section 11 is secured in the cover 5 in the way just described, and the other sections are secured each in turn to the preceding section in a way which is well understood by workers in this art.

It is obvious that this invention is not limited to securing a binding post in a temporary binder, but may be applied to the securing of any headed article in place by the use of a washer which penetrates the shank of the headed article, as the washer 7ª penetrates the shank 3 in the illustration shown.

I am aware that numerous details of construction and procedure may be varied through a wide range without departing from the principles of this invention, and I therefore do not purpose limiting the patent granted otherwise than necessitated by the prior art.

I claim as my invention:

1. A method of securing a headed article in place, which consists in passing the shank of the headed article through the object to which it is to be secured, slipping over the shank of the article a flat washer, slipping over the shank of the article a piece of sheet material in the form of a frustum of a cone, the inner edge of which closely fits said shank and abuts against said flat washer, and flattening said piece of material against said washer, whereby the inner edge of said sheet material will penetrate the body of said shank.

2. A headed article, a shank thereon, a groove in said shank near said head, a washer, the inner edge of which occupies said groove, and a second washer between said first-named washer and said head, the inner edge of which is external to said shank.

3. A post for loose leaf binders comprising a head, a tubular member extending from said head through the cover of the loose leaf binder, a washer thereon against the side of said cover opposite said head, a second washer against the side of the first-named washer opposite said cover, the inner edge of said last-named washer extending inward beyond the surface of said post.

4. In a fastening means, a post, a washer surrounding said post, and an arched annular member surrounding said post on one side of said washer, the inner edge of said arched member penetrating the body of the post.

5. A blank for forming a post fastening having the general form of the frustum of a cone, the elements of said frustum differing from those of a true cone by being convex inward.

In testimony whereof I have hereunto subscribed my name in the presence of two subscribing witnesses.

JAMES C. DAWSON.

Witnesses:
JOHN B. WHITE,
HUGH BUCHAN.